US011341018B2

(12) United States Patent
Li et al.

(10) Patent No.: US 11,341,018 B2
(45) Date of Patent: May 24, 2022

(54) METHOD AND DEVICE FOR DETECTING ABNORMAL OPERATION OF OPERATING SYSTEM

(71) Applicant: Acer Cyber Security Incorporated, Taipei (TW)

(72) Inventors: Chun-Hsien Li, New Taipei (TW); Chien-Hung Li, New Taipei (TW); Jun-Mein Wu, New Taipei (TW); Ming-Kung Sun, Taipei (TW); Zong-Cyuan Jhang, Taipei (TW); Yin-Hsong Hsu, New Taipei (TW); Chiung-Ying Huang, Taipei (TW); Tsung-Hsien Tsai, New Taipei (TW)

(73) Assignee: Acer Cyber Security Incorporated, Taipei (TW)

( * ) Notice: Subject to any disclaimer, the term of this patent is extended or adjusted under 35 U.S.C. 154(b) by 569 days.

(21) Appl. No.: 16/281,101

(22) Filed: Feb. 21, 2019

(65) Prior Publication Data

US 2020/0110689 A1    Apr. 9, 2020

(30) Foreign Application Priority Data

Oct. 8, 2018    (TW) ................................ 107135324

(51) Int. Cl.
*G06F 11/34*    (2006.01)
*G06F 11/30*    (2006.01)

(52) U.S. Cl.
CPC ...... *G06F 11/3438* (2013.01); *G06F 11/3058* (2013.01); *G06F 11/3075* (2013.01)

(58) Field of Classification Search
CPC ............. G06F 11/3438; G06F 11/3058; G06F 11/3075; G06F 21/552
See application file for complete search history.

(56) References Cited

U.S. PATENT DOCUMENTS 5,835,786 A * 11/1998 Brown ................ G06F 11/3055
                                                            710/15
6,963,983 B2 * 11/2005 Munson .................. G06F 11/30
                                                            726/5
(Continued)

FOREIGN PATENT DOCUMENTS

| TW | 200825771 | 6/2008 |
| TW | I528177 | 4/2016 |
| TW | I615730 | 2/2018 |

OTHER PUBLICATIONS

"Search Report of Europe Counterpart Application," issued on Oct. 1, 2019, pp. 1-6.

(Continued)

*Primary Examiner* — Matthew J Brophy
(74) *Attorney, Agent, or Firm* — JCIPRNET

(57) ABSTRACT

A method for detecting abnormality adapted to detect abnormal operations of an operating system is provided. The method includes: calculating a safe range of usage of the operating system during one or more time periods according to a historical data stream; calculating abnormal ratios corresponding to the one or more time periods according to a current data stream and the safe range of usage; selecting one or more abnormal time periods from the one or more time periods according to a threshold and the abnormal ratios; calculating an abnormal indicator for each of the one or more abnormal time periods according to the historical data stream and the current data stream; and ranking the one or more abnormal time periods according to the abnormal indicator(s).

16 Claims, 2 Drawing Sheets

(56) References Cited

U.S. PATENT DOCUMENTS

| | | | |
|---|---|---|---|
| 7,096,499 B2* | 8/2006 | Munson | G06F 11/3612 |
| | | | 714/E11.209 |
| 7,185,367 B2* | 2/2007 | Munson | G06F 11/3612 |
| | | | 714/E11.209 |
| 7,278,048 B2* | 10/2007 | Clark | G06F 11/0751 |
| | | | 714/1 |
| 7,571,478 B2* | 8/2009 | Munson | G06F 11/30 |
| | | | 726/23 |
| 8,707,194 B1 | 4/2014 | Jenkins | H04L 43/045 |
| | | | 715/772 |
| 8,973,133 B1* | 3/2015 | Cooley | H04L 63/1408 |
| | | | 726/22 |
| 9,124,640 B2 | 9/2015 | Sweet | G06F 21/577 |
| 9,619,376 B2* | 4/2017 | Bariska, Jr | G06F 11/302 |
| 10,761,828 B2* | 9/2020 | Kou | G06F 11/3604 |
| 2002/0138753 A1* | 9/2002 | Munson | G06F 11/3636 |
| | | | 726/26 |
| 2003/0200462 A1* | 10/2003 | Munson | G06F 21/55 |
| | | | 726/26 |
| 2004/0143756 A1* | 7/2004 | Munson | G06F 11/3612 |
| | | | 726/23 |
| 2005/0015683 A1* | 1/2005 | Clark | G06F 11/0706 |
| | | | 714/48 |
| 2006/0070118 A1* | 3/2006 | Munson | G06F 11/30 |
| | | | 726/3 |
| 2009/0292979 A1* | 11/2009 | Aggarwal | G06N 5/045 |
| | | | 714/819 |
| 2015/0026767 A1* | 1/2015 | Sweet | H04L 63/20 |
| | | | 726/1 |
| 2015/0082071 A1* | 3/2015 | Kim | G06F 1/30 |
| | | | 713/340 |
| 2016/0179661 A1* | 6/2016 | Bariska, Jr | G06F 11/0706 |
| | | | 717/127 |
| 2016/0357662 A1* | 12/2016 | Bariska, Jr | G06F 11/0778 |
| 2017/0177468 A1* | 6/2017 | Thangamani | G06F 11/3692 |
| 2018/0196657 A1* | 7/2018 | Kou | G06F 11/3604 |
| 2018/0225230 A1* | 8/2018 | Litichever | G06F 21/82 |
| 2018/0278647 A1* | 9/2018 | Gabaev | H04L 63/1466 |
| 2018/0349583 A1* | 12/2018 | Turgeman | G06F 21/554 |
| 2018/0359264 A1* | 12/2018 | Sweet | G06F 21/577 |
| 2019/0034625 A1* | 1/2019 | Ford | G06F 21/552 |
| 2019/0036959 A1* | 1/2019 | Ford | G06F 21/552 |
| 2019/0036970 A1* | 1/2019 | Shih | G06F 21/84 |
| 2019/0036971 A1* | 1/2019 | Ford | H04L 67/306 |

OTHER PUBLICATIONS

Varun Chandola et al., "Anomaly Detection : A Survey," ACM Computing Surveys, Sep. 1, 2009, pp. 1-72.

* cited by examiner

METHOD AND DEVICE FOR DETECTING ABNORMAL OPERATION OF OPERATING SYSTEM

CROSS-REFERENCE TO RELATED APPLICATION

This application claims the priority benefit of Taiwan application serial no. 107135324, filed on Oct. 8, 2018. The entirety of the above-mentioned patent application is hereby incorporated by reference herein and made a part of this specification.

BACKGROUND OF THE INVENTION

1. Field of the Invention

The invention relates to an information security technology, and more particularly, to a method and a device for detecting abnormality which are adapted to detect abnormal operations of an operating system.

2. Description of Related Art

For behaviors like entering a login account and a password that a user needs to perform when using an operating system (OS), the device will store related information of the behaviors in a log. When these behaviors increase by a certain amount, this may represent a change in the behavior of the user or an intrusion of the operating system by a hacker. If the number of times a usage behavior is abnormal during a fixed time period, the usage behavior during the fixed time period would not match with the usage behavior stored during the same fixed time period in history. On that basis, in the conventional technology, different abnormal prediction models may be built for different time periods so whether the corresponding time period is abnormal can be determined according to the abnormal prediction models. However, when intending to observe whether the operating system is abnormal, the user needs to replace the used abnormal prediction model based on the time period to be observed. Consequently, this would bring a lot of inconvenience to the user and waste a lot of device computations.

SUMMARY OF THE INVENTION

In consideration of the above, the invention provides a method and a device for detecting abnormal operations of an operating system, which can help the user to fully understand a pattern of the abnormal operations of the operating system.

The method for detecting abnormality of the invention is adapted to detect the abnormal operations of the operating system, and the method includes: calculating a safe range of usage of the operating system during one or more time periods according to a historical data stream; calculating abnormal ratios corresponding to the one or more time periods according to a current data stream and the safe range of usage; selecting one or more abnormal time periods from the one or more time periods according to a threshold and the abnormal ratios; calculating an abnormal indicator for each of the one or more abnormal time periods according to the historical data stream and the current data stream; and ranking the one or more abnormal time periods according to the abnormal indicator(s).

The device for detecting abnormality of the invention is adapted to detect the abnormal operations of the operating system, and includes a storage unit and a processing unit. The storage unit is configured to store a plurality of modules. The processing unit is coupled to the storage unit, and configured to access and execute a plurality of modules stored by the storage unit. The modules include a database, a recording module and an abnormality detection module. The database stores a historical data stream. The recording module records a current data stream. The abnormality detection module is configured for: calculating a safe range of usage of the operating system during one or more time periods according to a historical data stream; calculating abnormal ratios corresponding to the one or more time periods according to the current data stream and the safe range of usage; selecting one or more abnormal time periods from the one or more time periods according to a threshold and the abnormal ratios; calculating an abnormal indicator for each of the one or more abnormal time periods according to the historical data stream and the current data stream; and ranking the one or more abnormal time periods according to the abnormal indicator(s).

Based on the above, the invention proposes a concept in which the safe range of usage may be dynamically adjusted based on the holiday so the invention will not erroneously determine the behavior of the user due to changes caused by holidays. On the other hand, the invention can rank the abnormal time periods based on the different abnormal degrees so the user is able to quickly understand a peak period during which the operating system is abnormal or the abnormal degrees of the operating system in the different time intervals, thereby helping the user to determine possible causes of abnormality.

To make the above features and advantages of the invention more comprehensible, several embodiments accompanied with drawings are described in detail as follows.

DESCRIPTION OF THE EMBODIMENTS

Figure 1:
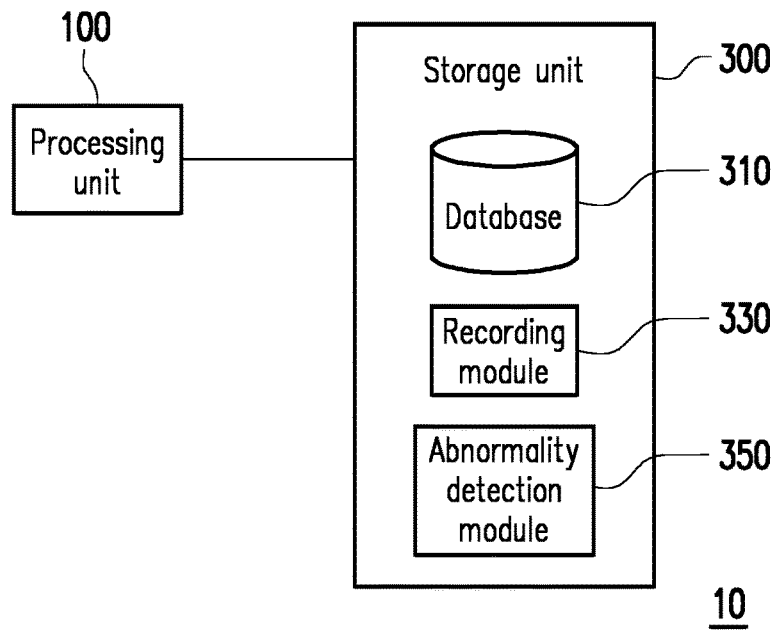
FIG. 1 is a schematic diagram illustrating a device for detecting abnormality according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In order to help the user to quickly understand the peak period during which the operating system is abnormal or the abnormal degrees of the operating system in different time intervals, the invention provides a method and a device for detecting abnormality adapted to detect abnormal operations of an operating system. The following content are provide for the reader to understand the creative spirit of the invention.

FIG. 1 is a schematic diagram illustrating a device 10 for detecting abnormality according to an embodiment of the invention. The device 10 may include a processing unit 100 and a storage unit 300.

The storage unit 300 is configured to store software, data and program codes required for running the device 10. The storage unit 300 may be, for example, a random access memory (RAM), a read-only memory (ROM), a flash memory, a hard Disk drive (HDD), a hard disk drive (HDD) as a solid state drive (SSD) or other similar devices in any stationary or movable form, or a combination of the above-mentioned devices.

The processing unit 100 is coupled to the storage unit 300, and can access and execute a plurality of modules stored by the storage unit 300. The processing unit 100 may be, for example, a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements.

The device 10 can receive a data stream associated with an operating system (OS), and detect whether the operating system has abnormal operations. In this embodiment, the storage unit 300 can store multiple modules, including a database 310, a recording module 330 and an abnormality detection module 350. Here, the database 310 is configured to store a historical data stream associated with the operating system, and the recording module 330 may be used to record a current data stream associated with the operating system. Functions of the abnormality detection module 350 would be described below.

Figure 2:
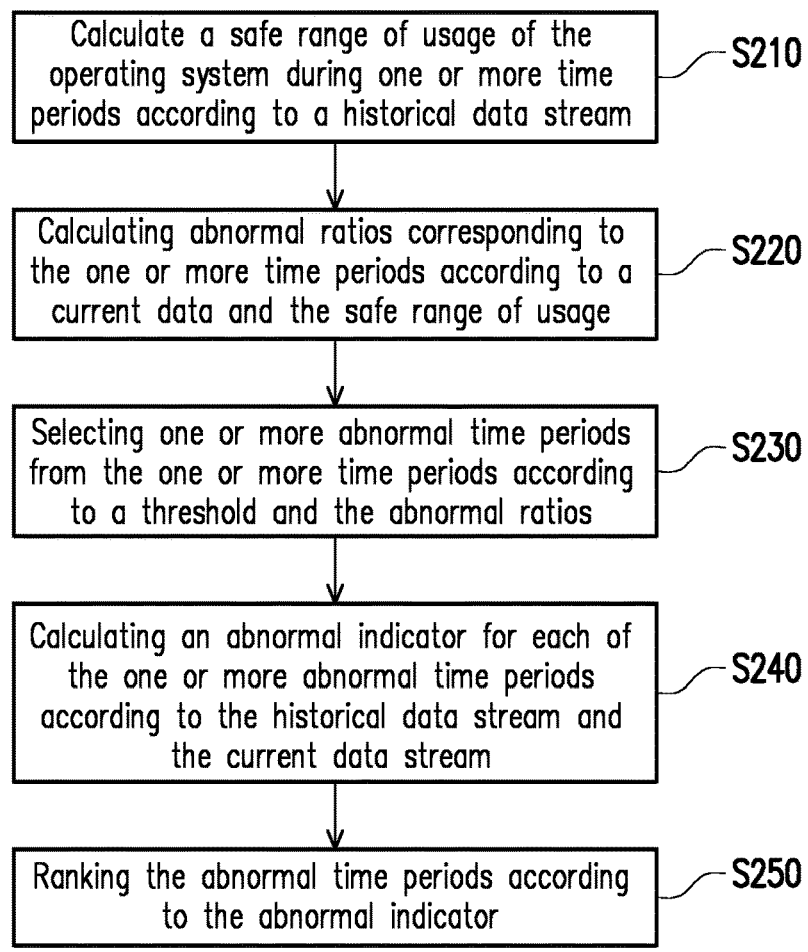
FIG. 2 is a flowchart illustrating a method for detecting abnormality according to an embodiment of the invention.

FIG. 2 is a flowchart illustrating a method 20 for detecting abnormality according to an embodiment of the invention. The method 20 may be implemented by the abnormality detection module 350 of the device 10 shown by FIG. 1, but the invention is not limited thereto.

In step S210, the abnormality detection module 350 can calculate a safe range of usage of the operating system during one or more time periods according to the historical data stream associated with the operating system in the database 310, wherein the historical data stream may correspond to one user. The historical data stream may include a historical usage and a historical degree of change of the operating system during the one or more time periods. With Table 1 as an example, Table 1 lists an exemplified format of the historical data stream of the invention.

TABLE 1

| Data number | User code | Day of the week | Holiday | Time period | Historical usage | Historical degree of change |
|---|---|---|---|---|---|---|
| 1 | 1 | Monday | No | 7:00~8:00 | 22.5 | 3.5535 |
| 2 | 1 | Monday | Yes | 7:00~8:00 | 2.5 | 2.1213 |
| 3 | 2 | Friday | No | 22:00~23:00 | 17.5 | 3.5355 |
| 4 | 2 | Friday | Yes | 22:00~23:00 | 3.0 | 1.4142 | wherein the historical usage is used to represent a number of the abnormal operations of the operating system, and may correspond to one or more operation features. The operation features are associated with a number of logins to the operating system, a number of IP (Internet Protocol) addresses accessed by the operating system or a number of ports used by the operating system, but the invention is not limited thereto. For instance, if the historical usage listed in Table 1 represents the times of IP address(es) being accessed by the operating system (i.e., the operation feature corresponding to the historical usage is associated with the times of IP address(es) being accessed by the operating system), the historical usage "22.5" corresponding to the data number "1" represents that the times of IP address(es) being accessed by the operating system during the time period of the data number "1" in the past is 22.5. The historical usage may be represented by an average, a median or other statistical quantities, and the historical degree of change may be represented by a standard deviation, a variance or other statistical quantities. The time period and the corresponding historical usage in Table 1 are based on one hour, but they may also be based on different time units such as one day, one week, one month, one season or one year.

Based on the historical usage and the historical degree of change during the one or more time periods stored by the historical data stream, the abnormality detection module 350 can calculate the safe range of usage of the operating system during one time period (an upper bound and a lower bound the safe range of usage) through for example, Formula (1) and Formula (2):

$$\text{Upper bound} = \mu_h + \alpha \cdot \sigma_h \qquad \text{Formula (1)}$$

$$\text{Lower bound} = \mu_h - \alpha \cdot \sigma_h \qquad \text{Formula (2)}$$

wherein $\mu_h$ is the historical usage, $\alpha$ is a tolerance coefficient and $\sigma_h$ h is the historical degree of change. The tolerance coefficient $\alpha$ may be customized by the user based on a usage habit. With Table 1 as an example, if the user "1" in Table 1 has higher usage of the operating system on a non-holiday, the tolerance coefficient $\alpha$ of the non-holiday may be increased to expand the safe range of usage. In this way, the device 10 may be prevented from erroneously determining that the usage of the user "1" is abnormal due to different usage habits of the user "1" on the holiday and the non-holiday. The tolerance coefficient $\alpha$ may also be adjusted according to weeks, months, seasons or any factors that may affect the habits of the user using the operating system, which are not particularly limited by the invention.

Table 2 is an example of the safe range of usages calculated for each time period based on the content of Table 1, Formula (1) and Formula (2):

TABLE 2

| Data number | User code | Day of the week | Holiday | Time period | Historical usage | Historical degree of change | Tolerance coefficient | Upper bound of safe range | Lower bound of safe range |
|---|---|---|---|---|---|---|---|---|---|
| 1 | 1 | Monday | No | 7:00~8:00 | 22.5 | 3.5535 | 2 | 29.607 | 15.393 |
| 2 | 1 | Monday | Yes | 7:00~8:00 | 2.5 | 2.1213 | 1 | 4.6213 | 0.3787 |
| 3 | 2 | Friday | No | 22:00~23:00 | 17.5 | 3.5355 | 2 | 24.571 | 10.429 |
| 4 | 2 | Friday | Yes | 22:00~23:00 | 3.0 | 1.4142 | 1 | 4.4142 | 1.5858 |

As shown by Table 2, the abnormality detection module 350 can calculate the safe range of usages for different users in different time periods.

After calculating the safe range of usage during the one or more time periods, in step S220, the abnormality detection module 350 can calculate abnormal ratios corresponding to the one or more time periods according to the current data stream recorded by the recording module 330 and the safe range of usage, wherein the current data stream may correspond to one user. The current data stream may include a current usage of the operating system during the one or more time periods, and the current usage will be defined below.

Specifically, the abnormality detection module 350 can calculate the abnormal ratio based on a proportion of the current usage corresponding to the one or more operation features in the safe range of usage, as shown by Formula (3).

Abnormal ratio=$q/p$              Formula (3)

wherein q is a number of the operation features of the current usage outside the safe range of usage, and p is a total number of operation features. With Table 2 as an example, it is assumed that at 7:00~8:00 on Monday that is the non-holiday (i.e., the time period corresponding to the data number "1" in Table 2), among three operation features (e.g., the number of logins to the operating system, the umber of IP addresses accessed by the operating system and the number of ports used by the operating system) of an operation performed on the operating system by the user "1" (i.e., p=3), the current usages corresponding to two operation features (e.g., the number of logins to the operating system and the times of IP address(es) being accessed by the operating system) are outside the safe range of usage (i.e., q=2) and the current usage of one operation feature (e.g., the number of ports used by the operating system) is in the safe range of usage. This condition represents that, as compared to the same time period in the past (i.e., a past time period corresponding to the time period of the data number being "1" in Table 2), the two operation features of the user "1" regarding the number of logins to the operating system and the times of IP address(es) being accessed by the operating system are abnormal. The abnormality detection module 350 can calculate that the abnormal ratio corresponding to the user "1" during the time period (i.e., the time period corresponding to the data number "1" in Table 2) is 2/3 through Formula (3).

After calculating the abnormal ratios corresponding to one or more time periods, in step S230, the abnormality detection module 350 can select one or more abnormal time periods from the one or more time periods according to a threshold and the abnormal ratios, as shown by Formula (4). If the abnormal ratio corresponding to one time period satisfies Formula (4), the abnormality detection module 350 then determines that such time period is the abnormal time period.

Abnormal ratio≥$\beta$              Formula (4)

wherein $\beta$ is the threshold. With Table 2 as an example, if $\beta$=0.5 and the abnormal ratio corresponding to a particular time period of the data number "1" in Table 2 is 2/3, according to Formula (4) (the abnormal ratio "2/3"≥1/2), it can be known that the particular time period should be determined as the abnormal time period by the abnormality detection module 350.

After the one or more abnormal time periods are selected, in step S240, the abnormality detection module 350 can calculate an abnormal indicator for each of the one or more abnormal time periods according to the historical data stream and the current data stream. In detail, the abnormality detection module 350 can calculate an abnormal degree of a first abnormal time period according to the historical usage, the historical degree of change and the current usage corresponding to the first abnormal time period in the historical data stream, as shown by Formula (5).

$$s = \frac{|\mu_h - \mu_c|}{\sigma_h}$$              Formula (5)

wherein s is the abnormal degree, $\mu_h$ is the historical usage, $\sigma_h$ is the historical degree of change and $\mu_c$ is the current usage.

With data in Table 1 as an example, if the time periods corresponding to the data with the data numbers "1", "2", "3" and "4" in Table 1 are all determined as the abnormal time periods in step S230, after obtaining the current usage of each time period in Table 1 by recording the current usage, the abnormal time period 350 can calculate the abnormal degree for each of the time periods in Table 1 based on Formula (5), as shown by Table 3.

TABLE 3

| Data number | User code | Day of the week | Holiday | Time period | Historical usage | Historical degree of change | Current usage | Abnormal degree |
|---|---|---|---|---|---|---|---|---|
| 1 | 1 | Monday | No | 7:00~8:00 | 22.5 | 3.5535 | 50 | 7.7388 |
| 2 | 1 | Monday | Yes | 7:00~8:00 | 2.5 | 2.1213 | 1 | 0.7071 |
| 3 | 2 | Friday | No | 22:00~23:00 | 17.5 | 3.5355 | 16 | 0.4242 |
| 4 | 2 | Friday | Yes | 22:00~23:00 | 3.0 | 1.4142 | 20 | 12.0209 | wherein the current usage may be used to represent a number of the abnormal operations of the operating system, and correspond to one or more operation features. The operation features are associated with the number of logins to the operating system, the times of IP address(es) being accessed by the operating system or the number of ports used by the operating system, but the invention is not limited thereto. For instance, if the current usage listed in Table 3 represents the times of IP address(es) being accessed by the operating system (i.e., the operation feature corresponding to the current usage is associated with the times of IP address(es) being accessed by the operating system), the current usage "50" corresponding to the data number "1" represents that the times of IP address(es) being accessed by the operating system during the time period of the data number "1" is 50. The current usage may be represented by an average, a median or other statistical quantities.

In this embodiment, the abnormal degree may represent the abnormal indicator. Accordingly, after the abnormal degree is calculated for each of the abnormal time periods, the abnormal indicator may be obtained for each of the abnormal time periods. Afterwards, in step S250, the abnormality detection module 350 can rank the abnormal time periods according to the abnormal indicators. With data in Table 3 as an example, the abnormality detection module 350 can rank the abnormal time periods of the data in table 1 in a sequence of the data number "4", the data number "1", the data number "2" and the data number "3" according to amounts of the abnormal indicators (i.e., the abnormal degrees). In other words, the abnormal time period corresponding to the data number "4" is ranked as the top position. That is to say, the abnormal time period corresponding to the data number "4" may need the most attention from the user.

Figure 3:
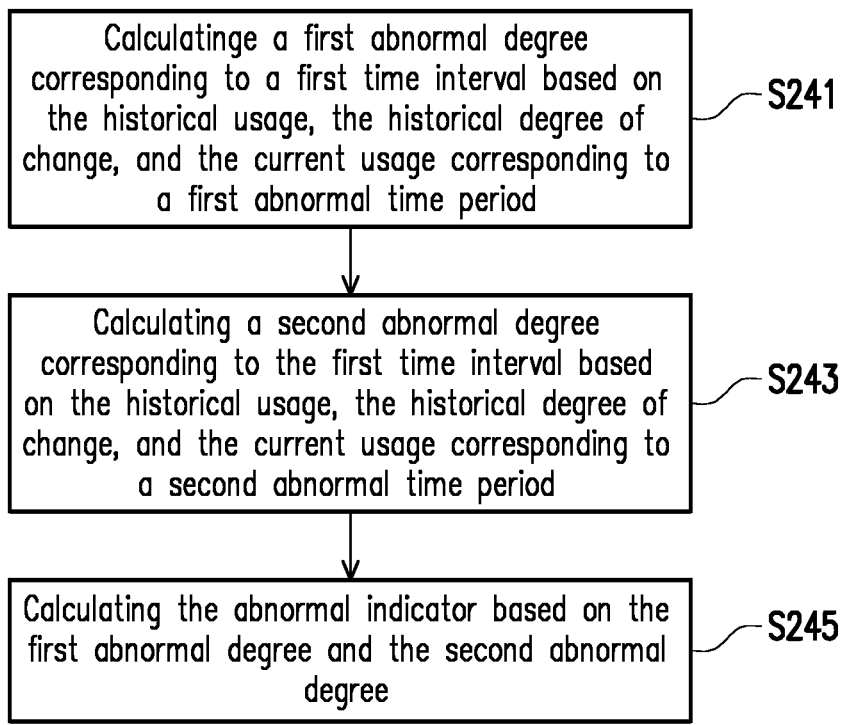
FIG. 3 is a flowchart further illustrating step in FIG. 2 according to an embodiment of the invention.

In certain embodiments, the abnormal indicator may be represented by a comprehensive abnormal degree composed of various abnormal degrees, and step S240 for calculating the abnormal indicator may be further divided into steps in the processing flow shown in FIG. 3. FIG. 3 is a flowchart further illustrating step S240 in FIG. 2 according to an embodiment of the invention.

In step S241, the abnormality detection module 350 can calculate a first abnormal degree corresponding to a first time interval based on the historical usage, the historical degree of change and the current usage corresponding to a first abnormal time period, wherein the first abnormal time period is included in the one or more abnormal time periods described in step S240. Specifically, the abnormality detection module 350 can calculate an abnormal degree s (hereinafter, also known as "a first abnormal degree $s_1$") according to Formula (5).

With Table 4 as an example, Table 4 lists a plurality of abnormal time periods, wherein the time period corresponding to the data number "1" is the first abnormal time period, the time period corresponding to the data number "2" is a second abnormal time period, the time period corresponding to the data number "3" is a third abnormal time period, and so on and so forth. It is assumed that the time period corresponding to the data number "1" is the first abnormal time period (i.e., the time period "7:00~8:00", and the time unit used is one hour) and the first time interval is set to be in units of one hour. The abnormality detection module 350 can calculate that the first abnormal degree $s_1$ of the first abnormal time period=7.7388 according to Formula (5).

Next, in step S243, the abnormality detection module 350 can calculate a second abnormal degree corresponding to the first time interval based on the historical usage, the historical degree of change and the current usage corresponding to a second abnormal time period, wherein a second time interval may be different from the first time interval. The second abnormal time period is included in the one or more abnormal time periods described in step S240. Further, in certain embodiments, the first time interval may include a plurality of second time intervals. Specifically, the abnormality detection module 350 can calculate an abnormal degree $s_2$ of the second abnormal time period according to Formula (5), wherein the abnormal degree $s_2$ corresponds to the second time interval. After calculating the abnormal degree $s_2$, the abnormality detection module 350 can convert the abnormal degree $s_2$ corresponding to the second time interval into a second abnormal degree $s'_2$ corresponding to the first time interval through Formula (6).

$$s'_2 = \max_{1 \leq i \leq n} (s_{2,i}) \quad \text{Formula (6)}$$

wherein n is a number of the second time intervals included in the first time interval, and $s_{2,i}$ is the abnormal degree of an $i^{th}$ second time interval in the first time interval.

With Table 4 as an example, the time period corresponding to the data number "2" is first set to be the second abnormal time period, and the second time interval is set to be in units of one minute. The abnormality detection module 350 can calculate that the abnormal degree $s_{2,i}$ of the second abnormal time period=0.0682 according to Formula (5), wherein $s_{2,i}$ corresponds the $1^{st}$ (i.e., i=1) second time interval (in units of one minute) in the first time interval (in units of one hour). Based on the similar steps, the abnormality detection module 350 can calculate that the abnormal degrees $s_{2,2}$ (corresponding to the data number "3")=0.5200, . . . , and $s_{2,60}$ (corresponding to the data number "61") =0.4333 corresponding to the second time intervals according to Formula (5). Next, through Formula (6), the abnormality detection module 350 can convert the abnormal degrees $s_{2,1}, s_{2,2}, \ldots$, and $s_{2,60}$ corresponding to the second time intervals (e.g., one minute) into the second abnormal degree $s'_2$ corresponding to the first time interval (e.g., one hour), as shown by Formula (7).

$$s'_2 = \max_{1 \leq i \leq n} (s_{2,i}) = \max(0.0682, 0.5200, \ldots, 0.4333) \quad \text{Formula (7)}$$

After calculating the first abnormal degree $s_1$ associated with the first abnormal time period and the first time interval and the second abnormal degree $s'_2$ associated with the second abnormal time period and the first time interval, in step S245, the abnormality detection module 350 can calculate the abnormal indicator based on the first abnormal

TABLE 4

| Data number | User code | Day of the week | Holiday | Time period | Historical usage | Historical degree of change | Current usage | Abnormal degree |
|---|---|---|---|---|---|---|---|---|
| 1 | 1 | Monday | No | 7:00~8:00 | 22.5 | 3.5535 | 50 | 7.7388 |
| 2 | 1 | Monday | No | 7:00~7:01 | 0.37 | 5.42 | 0 | 0.0682 |
| 3 | 1 | Monday | No | 7:01~7:02 | 0.4 | 5 | 3 | 0.5200 |
| . . . | . . . | . . . | . . . | . . . | . . . | . . . | . . . | . . . |
| 61 | 1 | Monday | No | 7:59~8:00 | 0.2 | 3 | 1.5 | 0.4333 | degree $s_1$ and the second abnormal degree $s'_2$. Specifically, the abnormality detection module 350 can calculate the abnormal indicator according to Formula (8).

$$\text{Abnormal indicator} = \omega_1 \cdot s_1 + \omega_2 \cdot s'_2 \quad \text{Formula (8)}$$

wherein $\omega_1$ and $\omega_2$ are weights which may be adjusted by the user based on actual requirements and is not particularly by the invention. In this way, the abnormal indicator calculated using Formula (8) can have the abnormal degrees for different abnormal time periods (e.g., the time period "7:00~8:00" corresponding to the data number "1" in Table 4 and the time period "7:00~7:01" corresponding to the data number "2" in Table 4) corresponding to the same time interval (e.g., one hour) taken into consideration.

Figure 4:
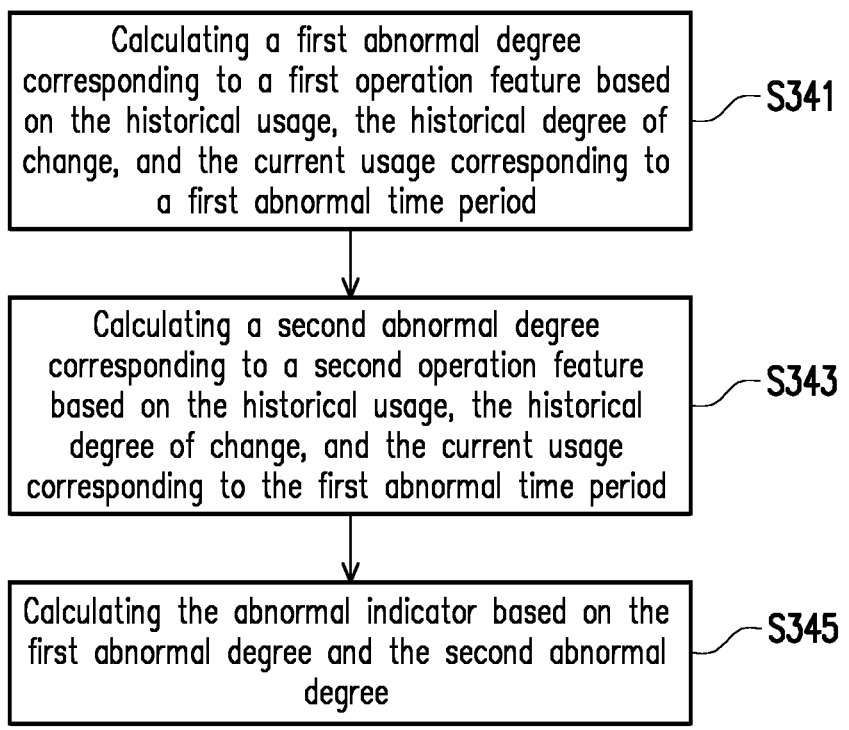
FIG. 4 is a flowchart further illustrating step in FIG. 2 according to another embodiment of the invention.

In certain embodiments, the abnormal indicator may be represented by a comprehensive abnormal degree composed of various abnormal degrees, and step S240 for calculating the abnormal indicator may be further divided into steps in the processing flow shown in FIG. 4. FIG. 4 is a flowchart further illustrating step S240 in FIG. 2 according to another embodiment of the invention.

In step S341, the abnormality detection module 350 can calculate a first abnormal degree corresponding to a first operation feature based on the historical usage, the historical degree of change and the current usage corresponding to a first abnormal time period, wherein the first operation feature may be associated with the number of logins to the operating system, the times of IP address(es) being accessed by the operating system, or the number of ports used by the operating system.

With data in Table 5 as an example, the abnormality detection module 350 can calculate that a first abnormal degree $y_1$ corresponding to the first operation feature (one with the field under the operation feature filled by "1") during the first abnormal time period (e.g., 7:00~8:00)= 7.7388 according to Formula (5).

TABLE 5

| Data number | User code | Day of the week | Holiday | Time period | Operation feature | Historical usage | Historical degree of change | Current usage | Abnormal degree |
|---|---|---|---|---|---|---|---|---|---|
| 1 | 1 | Monday | No | 7:00~8:00 | 1 | 22.5 | 3.5535 | 50 | 7.7388 |
| 2 | 1 | Monday | No | 7:00~8:00 | 2 | 21 | 5 | 2 | 3.8 | wherein "1" in the field under the operation feature represents the number of logins to the operating system, and "2" in the field under the operation feature represents the times of IP address(es) being accessed by the operating system.

Next, in step S343, the abnormality detection module 350 can calculate a second abnormal degree corresponding to a second operation feature based on the historical usage, the historical degree of change, and the current usage corresponding to the first abnormal time period, wherein the second operation feature may be associated with the number of logins to the operating system, the times of IP address(es) being accessed by the operating system, or the number of ports used by the operating system.

With data in Table 5 as an example, the abnormality detection module 350 can calculate that the second abnormal degree $y_2$ corresponding to the second operation feature (one with the field under the operation feature filled by "2") during the first abnormal time period (e.g., 7:00~8:00)=3.8 according to Formula (5).

After calculating the first abnormal degree $y_1$ associated with the first operation feature and the second abnormal degree $y_2$ associated with the second operation feature, in step S345, the abnormality detection module 350 can calculate the abnormal indicator based on the first abnormal degree $y_1$ and the second abnormal degree $y_2$. Specifically, the abnormality detection module 350 can calculate the abnormal indicator according to Formula (9).

$$\text{Abnormal indicator} = \max(y_1, y_2) \quad \text{Formula (9)}$$

In this way, the abnormal indicator calculated using Formula (9) can have the abnormal degrees corresponding to the different operation features (e.g., in Table 4, "the number of logins to the operating system" corresponding to the data number "1" and "the times of IP address(es) being accessed by the operating system" corresponding to the data number "2") taken into consideration.

In summary, the invention can calculate a reasonable safe range of usage of the user according to behavior information regarding how the user operates the operating system during each time period in the past, and can observe whether the behavior of the user is abnormal during one time period in the future based on the safe range of usage. Accordingly, the invention does not need to re-calculate the safe range of usage corresponding the observed time period due to the change of the observed time period. Furthermore, since the safe range of usage may be dynamically adjusted based on the holiday, the invention will not erroneously determine the behavior of the user due to changes caused by holidays. On the other hand, the invention can rank the abnormal time periods based on the different abnormal degrees so the user is able to quickly understand the peak period during which the operating system is abnormal or the abnormal degrees of the operating system in the different time intervals, thereby helping the user to determine possible causes of abnormality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting abnormality, adapted to detect abnormal operations of an operating system, the method comprising:
   calculating a safe range of usage of the operating system during one or more time periods according to a historical data stream, comprising:
      adjusting a tolerance coefficient during the one or more time periods based on the one or more time periods being a holiday; and
      calculating the safe range of usage according to the tolerance coefficient;
   calculating abnormal ratios corresponding to the one or more time periods according to a current data stream and the safe range of usage, wherein the historical data stream and the current data stream are associated with a number of ports used by the operating system;
   selecting one or more abnormal time periods from the one or more time periods according to a threshold and the abnormal ratios;
   calculating an abnormal indicator for each of the one or more abnormal time periods according to the historical data stream and the current data stream; and
   ranking the one or more abnormal time periods according to the abnormal indicator.

2. The method according to claim 1, wherein the historical data stream comprises a historical usage and a historical degree of change of the operating system during the one or more time periods, and the current data stream comprises a current usage of the operating system during the one or more time periods.

3. The method according to claim 2, wherein the step of calculating the safe range of usage of the operating system during the one or more time periods according to the historical data stream further comprises:
calculating the safe range of usage according to the historical usage, the historical degree of change, and the tolerance coefficient during the one or more time periods.

4. The method according to claim 2, wherein the step of calculating the abnormal ratios corresponding to the one or more time periods according to the current data stream and the safe range of usage comprises:
calculating the abnormal ratios based on a proportion of the current usage corresponding to one or more operation features in the safe range of usage.

5. The method according to claim 2, wherein the step of calculating the abnormal indicator for each of the one or more abnormal time periods according to the historical data stream and the current data stream comprises:
calculating a first abnormal degree corresponding to a first time interval based on the historical usage, the historical degree of change, and the current usage corresponding to a first abnormal time period;
calculating a second abnormal degree corresponding to the first time interval based on the historical usage, the historical degree of change, and the current usage corresponding to a second abnormal time period; and
calculating the abnormal indicator based on the first abnormal degree and the second abnormal degree, wherein the first abnormal time period and the second abnormal time period are included in the one or more abnormal time periods.

6. The method according to claim 2, wherein the step of calculating the abnormal indicator for each of the one or more abnormal time periods according to the historical data stream and the current data stream comprises:
calculating a first abnormal degree corresponding to a first operation feature based on the historical usage, the historical degree of change and the current usage corresponding to a first abnormal time period;
calculating a second abnormal degree corresponding to a second operation feature based on the historical usage, the historical degree of change and the current usage corresponding to the first abnormal time period; and
calculating the abnormal indicator based on the first abnormal degree and the second abnormal degree.

7. The method according to claim 2, further comprising:
representing the current usage and the historical usage by one of an average and a median; and
representing the historical degree of change by one of a standard deviation and a variance.

8. The method according to claim 2, wherein the historical usage and the current usage correspond to one or more operation features, and the one or more operation features are associated with at least one of: a number of logins to the operating system, times of internet protocol address being accessed by the operating system, and the number of ports used by the operating system.

9. A device for detecting abnormality, adapted to detect abnormal operations of an operating system, the device comprising:
a storage unit, storing a plurality of modules; and
a processing unit, coupled to the storage unit, and configured to access and execute the plurality of modules stored by the storage unit, the modules comprising:
a database, storing a historical data stream;
a recording module, recording a current data stream; and
an abnormality detection module, configured for:
calculating a safe range of usage of the operating system during one or more time periods according to the historical data stream by:
adjusting a tolerance coefficient during the one or more time periods based on the one or more time periods being a holiday; and
calculating the safe range of usage according to the tolerance coefficient;
calculating abnormal ratios corresponding to the one or more time periods according to the current data stream and the safe range of usage, wherein the historical data stream and the current data stream are associated with a number of ports used by the operating system;
selecting one or more abnormal time periods from the one or more time periods according to a threshold and the abnormal ratios;
calculating an abnormal indicator for each of the one or more abnormal time periods according to the historical data stream and the current data stream; and
ranking the one or more abnormal time periods according to the abnormal indicator.

10. The device according to claim 9, wherein the historical data stream comprises a historical usage and a historical degree of change of the operating system during the one or more time periods, and the current data stream comprises a current usage of the operating system during the one or more time periods.

11. The device according to claim 10, wherein the abnormality detection module is further configured for:
calculating the safe range of usage according to the historical usage, the historical degree of change, and the tolerance coefficient during the one or more time periods.

12. The device according to claim 10, wherein the abnormality detection module is further configured for:
calculating the abnormal ratios based on a proportion of the current usage corresponding to one or more operation features in the safe range of usage.

13. The device according to claim 10, wherein the abnormality detection module is further configured for:
calculating a first abnormal degree corresponding to a first time interval based on the historical usage, the historical degree of change, and the current usage corresponding to a first abnormal time period;
calculating a second abnormal degree corresponding to the first time interval based on the historical usage, the historical degree of change, and the current usage corresponding to a second abnormal time period; and
calculating the abnormal indicator based on the first abnormal degree and the second abnormal degree, wherein the first abnormal time period and the second abnormal time period are included in the one or more abnormal time periods.

14. The device according to claim 10, wherein the abnormality detection module is further configured for:
calculating a first abnormal degree corresponding to a first operation feature based on the historical usage, the historical degree of change, and the current usage corresponding to a first abnormal time period;
calculating a second abnormal degree corresponding to a second operation feature based on the historical usage, the historical degree of change, and the current usage corresponding to the first abnormal time period; and calculating the abnormal indicator based on the first abnormal degree and the second abnormal degree.

15. The device according to claim 10, wherein the abnormality detection module is further configured for:

representing the current usage and the historical usage by one of an average and a median; and representing the historical degree of change by one of a standard deviation and a variance.

16. The device according to claim 10, wherein the historical usage and the current usage correspond to one or more operation features, and the one or more operation features are associated with at least one of: a number of logins to the operating system, times of internet protocol address accessed by the operating system, and the number of ports used by the operating system.

* * * * *